J. B. CUMMING.
WHEEL.
APPLICATION FILED JAN. 7, 1915.

1,168,287.

Patented Jan. 18, 1916.

WITNESSES
L. Hauerstein
B. Goff

INVENTOR
James Bouie Cumming
BY Munn & Co.
ATTORNEYS

UNITED STATES PATENT OFFICE.

JAMES BOUIE CUMMING, OF ELLERSLIE, AUCKLAND, NEW ZEALAND.

WHEEL.

1,168,287.

Specification of Letters Patent. Patented Jan. 18, 1916.

Application filed January 7, 1915. Serial No. 1,019.

*To all whom it may concern:*

Be it known that I, JAMES BOUIE CUMMING, a subject of the King of Great Britain, and a resident of Ellerslie, Auckland, New Zealand, have invented a new and Improved Wheel, of which the following is a full, clear, and exact description.

The invention relates to a vehicle wheel characterized by the provision of a pneumatic cushion in the hub of the wheel for the purpose of reducing the shocks and vibration due to the weight applied to the wheel during the movement of the load on the wheel.

The object of the invention is to provide a simple, strong, convenient and inexpensive pneumatic wheel in which the parts subjected to wear are so positioned that they can be easily and quickly inspected and replaced.

With the above and other objects in view, the nature of which will more fully appear as the description proceeds, the invention consists in the novel construction, combination and arrangement of parts as herein fully described, illustrated and claimed.

Figure 1:
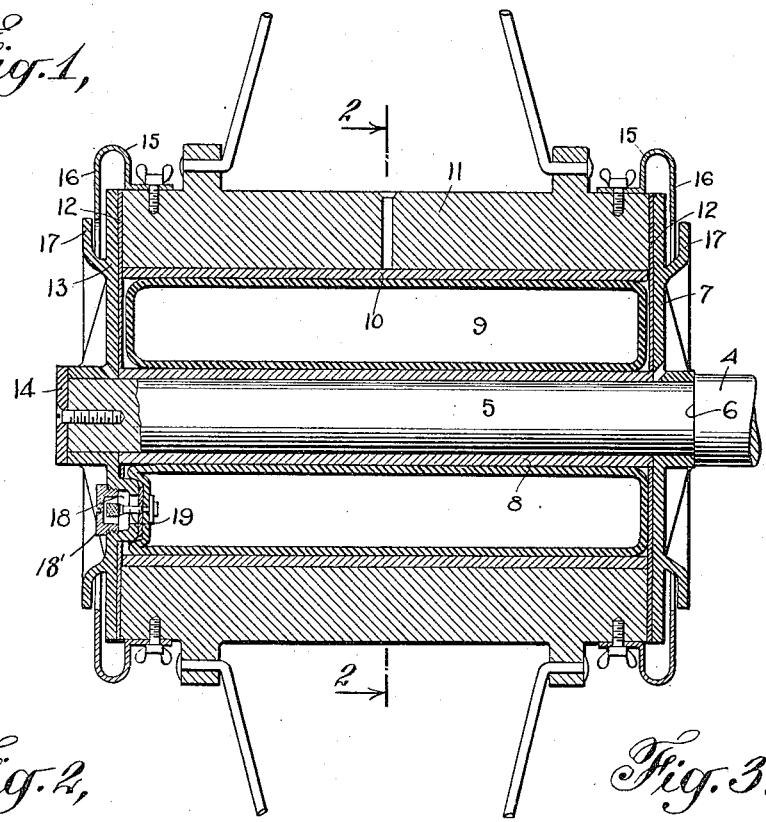
Figure 2:
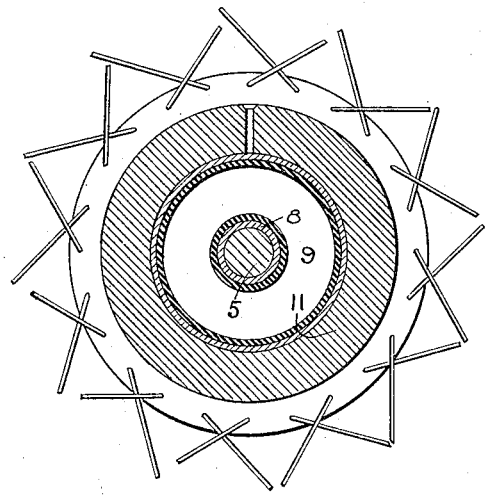
Figure 3:
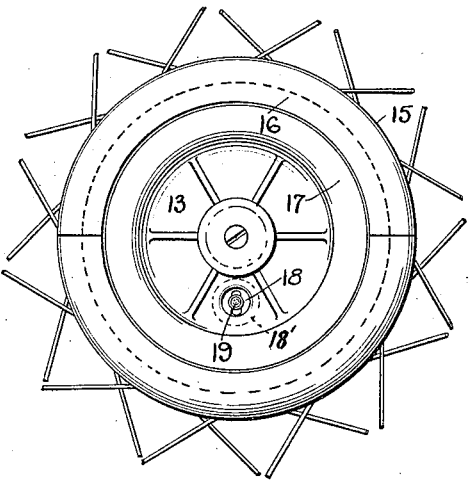

In the accompanying drawings, forming part of the application, similar characters of reference indicate corresponding parts in all the views, and Figure 1 is an axial section through a hub of a wheel embodying my invention; Fig. 2 is a transverse section through the hub on line 2—2, Fig. 1; and Fig. 3 is an end view.

Referring to the drawings, 4 represents an axle, preferably having a reduced end 5 so as to form a shoulder 6. In lieu of reducing the end a collar may be provided on the axle to obtain the same result. Abutting against the shoulder 6 of the axle is a flange or disk 7, against which abuts with one end a bushing 8 fitting snugly on the reduced end 5 of the axle. Surrounding the bushing 8 is an annular, pneumatic tube 9 of any suitable flexible material; said tube has substantially the length of the bushing 8 and fits tightly in a shell or sleeve 10 on which the hub 11 of the wheel is mounted to rotate. The shell and hub at one end abut against a leather washer 12 provided on the disk 7. The other end of said disk and washer is engaged by a similar disk 13 which is also provided with a similar leather washer. The said disk 13 engages also the end of the bushing 8. The end of the disk is engaged by a washer 14 which is secured to the axle 4 by any suitable means, whereby longitudinal displacement of the bushing 8, as well as of the sleeve 10 and hub 11, is prevented To prevent dust from entering between the leather washers 12 and the ends of the hub, guards 15 are secured to the hub 11, which guards have extensions 16 surrounding the edges of the disks 7 and 13. The disks 7 and 13 are also provided with an annular groove formed by the additional circular flanges 17 so as to further prevent the entrance of dust. The disk 13 is provided with an apertured recess 18 through which a valve 19 of the pneumatic tube projects. A removable cap 18' protects the valve from injury.

By providing a bushing and a sleeve between which the pneumatic tube is located, under no circumstances can the sleeve 10 or the bushing 8 rotate relative to the pneumatic tube, as the frictional resistance between the material of the tube and the sleeve or bushing is greater than the frictional resistance between the bushing and the axle of the sleeve and the hub. Normally the hub will rotate on the sleeve 10 as stated, as the slight deformation of the tube 9 under the load on the wheel will prevent, if not eliminate, any tendency of rotation of the bushing on the axle. It will be noted that by locating the tube within the hub the same is only subjected to pressure, and to no wear, through the rotation of the wheel.

From the foregoing description, taken in connection with the accompanying drawing, the advantage of the construction and operation of the wheel shown will be readily understood by those skilled in the art to which the invention pertains, and while I have described the principle of operation, together with the wheel which I now consider to be the best embodiment thereof, I desire to have it understood that the wheel shown is merely illustrative and that such changes may be made as are within the scope of the appended claims.

Having thus described my invention, I claim as new and desire to secure by Letters Patent:

1. The combination of an axle, a pair of disks on the axle, a bushing on the axle free to turn thereon and spacing the disks, said axle having means for maintaining the disks against the bushing, an annular pneumatic tube on said bushing between the disks, a sleeve on the pneumatic tube, a hub between the disks mounted to rotate on the sleeve, said disks having leather washers on their faces adapted to contact with the tube and the hub, and dust guards on the hub surrounding the edges of the disks, each of said disks having a flange projecting in front of the dust guard carried by the hub.

2. In combination, an axle, a pair of disks on the axle free to turn thereon, a bushing on the axle also free to turn thereon and spacing the disks, means associated with the axle for maintaining the disks against the bushing, an annular, pneumatic tube on the bushing between the disks, one of said disks having an apertured recess, said tube having a valve projecting into said recess, a sleeve on the pneumatic tube, a hub between the disks mounted to rotate on the sleeve, and a dust protector carried by the hub and surrounding the edge of the disk, each of the disks having a laterally projecting circular flange lying in front of the edge of the dust protector.

3. In combination, an axle, a pair of disks on the axle, a bushing on the axle free to turn thereon and spacing the disks, means associated with the axle for maintaining the disks against the bushing, an annular pneumatic tube on said bushing extending between the disks and having the ends thereof in close proximity to said disks, a sleeve fitting snugly over the pneumatic tube and extending through the entire length thereof, and a hub between the disks mounted to rotate on the sleeve, one of said disks having an apertured recess, said pneumatic tube having a valve projecting into said recess.

In testimony whereof I have signed my name to this specification in the presence of subscribing witnesses.

JAMES BOUIE $\overset{\text{his}}{\times}$ CUMMING.
mark

Witnesses:
MICHAEL MORRIS LEUIS,
JAMES KNOX,
E. F. COURTNEY.

Copies of this patent may be obtained for five cents each, by addressing the "Commissioner of Patents, Washington, D. C."